United States Patent
LaBarge et al.

(10) Patent No.: US 7,452,843 B2
(45) Date of Patent: Nov. 18, 2008

(54) EXHAUST TREATMENT DEVICES, CATALYST, AND METHODS OF MAKING AND USING THE SAME

(75) Inventors: William J. LaBarge, Bay City, MI (US); Joseph V. Bonadies, Clarkston, MI (US); Joachim Kupe, Davisburg, MI (US)

(73) Assignee: Umicore AG & Co. KG, Hanau (DE)

( * ) Notice: Subject to any disclaimer, the term of this patent is extended or adjusted under 35 U.S.C. 154(b) by 348 days.

(21) Appl. No.: 10/747,778

(22) Filed: Dec. 29, 2003

(65) Prior Publication Data

US 2005/0142042 A1    Jun. 30, 2005

(51) Int. Cl.
*B01J 23/00* (2006.01)
*B01J 21/06* (2006.01)

(52) U.S. Cl. .............. 502/326; 502/111; 502/327; 502/332; 502/333; 502/334; 502/339; 502/349; 502/350; 502/351

(58) Field of Classification Search ........ 502/302, 502/303, 325, 349, 350, 104, 111, 326, 327, 502/332, 333, 334, 339, 351
See application file for complete search history.

(56) References Cited

U.S. PATENT DOCUMENTS

| | | | | |
|---|---|---|---|---|
| 4,581,343 A | | 4/1986 | Blanchard et al. ........ 502/241 |
| 4,584,280 A | * | 4/1986 | Nanao et al. .............. 501/80 |
| 4,713,233 A | * | 12/1987 | Marsh et al. ............. 423/608 |
| 4,842,832 A | * | 6/1989 | Inoue et al. ............. 423/21.1 |
| 5,075,276 A | | 12/1991 | Ozawa et al. ............ 502/304 |
| 5,127,291 A | * | 7/1992 | Lothammer ............. 82/120 |
| 5,248,650 A | | 9/1993 | Sekiba et al. ............ 502/303 |
| 5,407,887 A | * | 4/1995 | Miyashita et al. ........ 502/258 |
| 5,532,096 A | * | 7/1996 | Maruta et al. ........... 430/111.1 |
| 5,571,492 A | | 11/1996 | Yao et al. ............... 423/263 |
| 5,580,536 A | | 12/1996 | Yao et al. ............... 423/263 |
| 5,645,891 A | * | 7/1997 | Liu et al. ............... 427/376.2 |
| 5,719,097 A | * | 2/1998 | Chang et al. ............ 502/325 |
| 5,731,486 A | * | 3/1998 | Hendriksen et al. ...... 585/511 |
| 5,762,894 A | | 6/1998 | Takatori et al. ......... 423/263 |

(Continued)

FOREIGN PATENT DOCUMENTS

EP    0 525 677 A1    2/1993

(Continued)

OTHER PUBLICATIONS

Berbenni V. and A. Marini, "Synthesis of SRxBA(1-x)TiO3, Solid Solutions from the Mechanically Activated System BaCO3-SrCO3-Ti02", CSGI—Dipartimento di Chimica Fisica dell'Universita di Pavia, Viale Taramelli 16, 27100 Pavia, Italy, Z. Naturforsch. 57 b, 859-864 (2002).

(Continued)

*Primary Examiner*—Cam N. Nguyen
(74) *Attorney, Agent, or Firm*—Robert G. Weilacher; Smith, Gambrell & Russell

(57) ABSTRACT

In one embodiment, an exhaust treatment device includes: a substrate, a shell disposed around the substrate, and a retention material disposed between the shell and the substrate. The substrate includes a catalyst that includes a precious metal and a solid solution comprising solid solution metals, wherein the solid solution metals include yttrium, zirconium, and titanium.

8 Claims, 1 Drawing Sheet

U.S. PATENT DOCUMENTS

| | | | |
|---|---|---|---|
| 5,800,806 A * | 9/1998 | Yamamoto | 424/76.1 |
| 5,837,642 A | 11/1998 | Tanaka et al. | 502/304 |
| 5,888,464 A | 3/1999 | Wu et al. | 423/213.5 |
| 5,898,014 A | 4/1999 | Wu et al. | 502/302 |
| 6,037,305 A | 3/2000 | Cuif et al. | 502/304 |
| 6,139,814 A | 10/2000 | Shigapov et al. | 423/592 |
| 6,171,572 B1 | 1/2001 | Aozasa | 423/593 |
| 6,180,075 B1 | 1/2001 | Lindner et al. | 423/213.2 |
| 6,235,677 B1 * | 5/2001 | Manzer et al. | 502/232 |
| 6,248,688 B1 | 6/2001 | Wu et al. | 502/302 |
| 6,261,989 B1 | 7/2001 | Tanaka et al. | 502/217 |
| 6,348,430 B1 | 2/2002 | Lindner et al. | 502/304 |
| 6,387,341 B1 * | 5/2002 | Sarrade et al. | 423/335 |
| 6,399,540 B1 * | 6/2002 | Oki et al. | 502/350 |
| 6,591,634 B1 * | 7/2003 | Morizane | 65/17.2 |
| 6,649,731 B2 * | 11/2003 | Hori et al. | 528/279 |
| 6,855,661 B2 * | 2/2005 | Kim | 502/219 |
| 7,067,346 B2 * | 6/2006 | Hill et al. | 438/57 |
| 2002/0193555 A1 * | 12/2002 | Hori et al. | 528/222 |
| 2005/0008777 A1 * | 1/2005 | McCleskey et al. | 427/226 |
| 2005/0137081 A1 * | 6/2005 | Kauffman | 502/311 |
| 2005/0229816 A1 * | 10/2005 | Krienke et al. | 106/287.1 |

FOREIGN PATENT DOCUMENTS

| | | |
|---|---|---|
| EP | 0 525 677 B1 | 2/1993 |
| JP | 62071536 A | 4/1987 |
| WO | WO 96/21506 | 7/1996 |

OTHER PUBLICATIONS

Fernandez-Garcia, M. et al., "New Strategies for the Improvement of Automobile Catalysts", International Journal of Molecular Sciences, 2001, 2, 251-262.

Hachisuka, Ichiro et al., "Improvement of NOx Storage-Reduction Catalyst", SAE Technical Paper Series, SAE World Congress, Detroit, Michigan, Mar. 4-7, 2002.

Imamura, S. et al, "Effect of cerium on the mobility of oxygen on manganese oxides", Applied Catalysis A: General 142 (1996) 279-288.

Kim, Dae-Joon and Tseng-Ying Tien, "Phase Stability and Physical Properties of Cubic and Tetragonal $ZrO_2$ in the System $ZrO_2$-$Y_2O_3$-$Ta_2O_5$", J. Am. Ceram. Soc., 74 [12] 3061-65 (1991).

Lamonier, C. et al., "Studies of the cerium-metal-oxygen-hydrogen system (metal=Cu, Ni)", Catalysis Today 50 (1999) 247-259.

Naik I.K. and T.Y.Tien, "Electrical Conduction in $Nb_2O_5$-Doped Cerium Dioxide", J. Electrochem. Soc.: Electrochemical Science and Technology, Apr. 1979, 562-566.

Tang, S. et al., "Partial oxidation of methane to syngas over Ni/MgO, Ni/CaO and Ni/$CeO_2$", Catalysis Letters 51 (1998) 169-175.

Terribile, Daniela et al., "Catalytic combustion of hydrocarbons with Mn and Cu-doped ceria-zirconia solid solutions", Catalysis Today 47 (1999) 133-140.

Teske, K. et al., "Thermal Analysis of Transition Metal and Rare Earth Oxide System-Gas Interactions by a Solid Electrolyte-based Coulometric Technique", Journal of Thermal Analysis, vol. 49 (1997) 1211-1220.

Zhang, Yu et al., "Nanophase catalytic oxides: I. Synthesis of doped cerium oxides as oxygen storage promoters", Applied Catalysis B: Environmental 6 (1995) 325-337.

* cited by examiner

EXHAUST TREATMENT DEVICES, CATALYST, AND METHODS OF MAKING AND USING THE SAME

BACKGROUND

In order to meet exhaust fluid emission standards, the exhaust emitted from internal combustion engines is treated prior to emission into the atmosphere. Exhaust fluids may be routed through at least one exhaust emission treatment device disposed in fluid communication with the exhaust outlet system of the engine, wherein the exhaust fluids are treated by reactions with a catalyst composition deposited on a porous support material. Examples of exhaust emission treatment devices include catalytic converters, catalytic absorbers, diesel particulate traps, and the like. The exhaust fluid generally contains undesirable emission components including carbon monoxide (CO), hydrocarbons (HC), and nitrogen oxides ($NO_x$), sulfates ($SO_3$) and particulates. In particular, sulfur compounds deactivate precious metals, and the temperature needed for precious metal regeneration exceeds exhaust temperatures. As a means of simultaneously removing the objectionable CO, HC, $NO_x$ and $SO_x$ components, various catalyst compositions have been developed.

However, a need remains in the art for an improved catalyst compositions used in a catalytic exhaust treatment device.

SUMMARY

Disclosed herein are exhaust treatment devices, catalysts, and methods of making and using the same. One embodiment of an exhaust treatment device comprises a substrate, a shell disposed around the substrate, and a retention material disposed between the shell and the substrate. The substrate comprises a catalyst that comprises a precious metal and a solid solution comprising solid solution metals. The solid solution metals comprise yttrium, zirconium, and titanium.

One embodiment of a method of making a catalyst comprises forming an organometallic precursor comprising zirconium and titanium by the etherification of an alcohol, and decomposing the precursor to form a catalyst comprising a titanium-zirconium solid solution.

The above-described and other features will be appreciated and understood by those skilled in the art from the following detailed description, and appended claims.

BRIEF DESCRIPTION OF THE DRAWINGS

Refer now to the figure, which is an exemplary embodiment.

DETAILED DESCRIPTION

Figure 1:
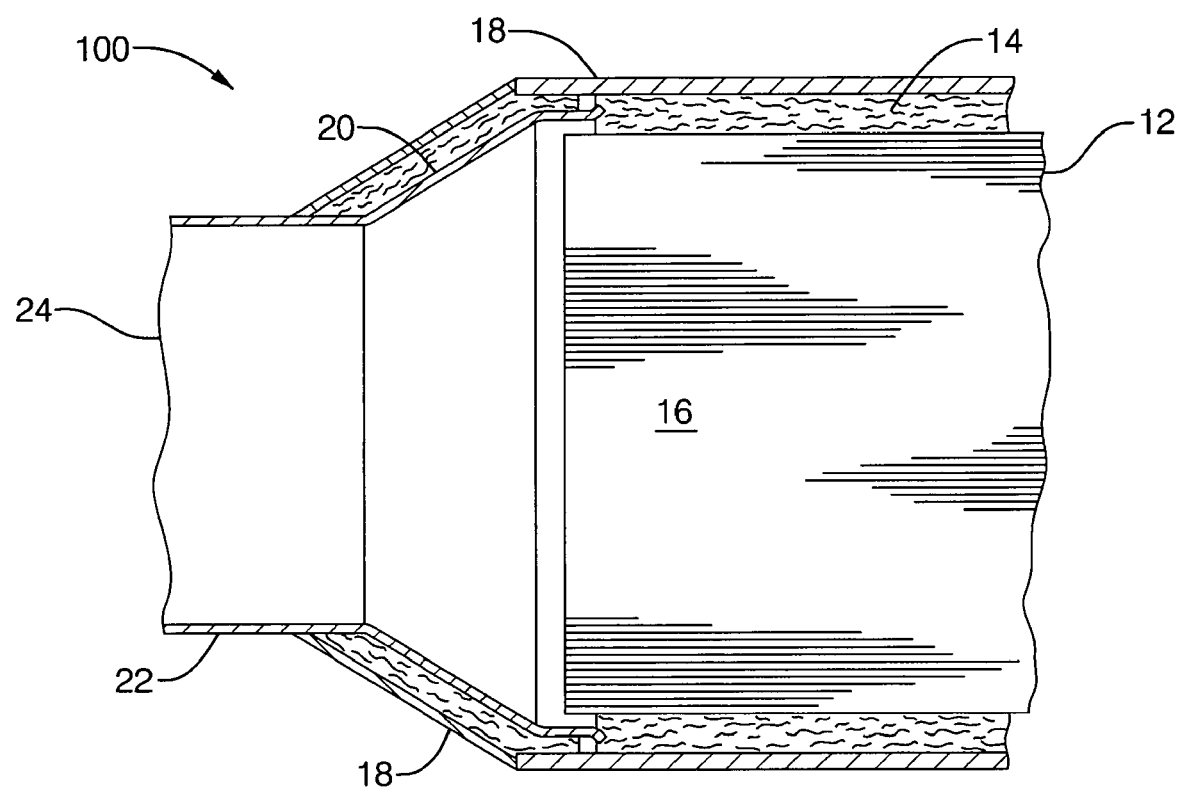
FIG. 1 is a partial cross-sectional view of an exhaust treatment device.

Referring now to FIG. 1, an exemplary embodiment of an exhaust treatment device generally designated 100 is illustrated. The exhaust treatment device 100 may include, but is not limited to, the following examples, catalytic converters, evaporative emissions devices, scrubbing devices (e.g., hydrocarbon, sulfur, and the like), particulate filters/traps, adsorbers plasma reactors (e.g., non-thermal plasma reactors, and the like), and the like, as well as combinations comprising at least one of the foregoing devices. The exhaust treatment device 100 comprises a substrate 12 disposed within a retention material 14 forming a subassembly 16. A shell 18 is disposed around the subassembly 16. An end-cone 20 comprising a snorkel 22 having an opening 24 is in physical communication with shell 18. Opening 24 allows exhaust fluid communication with substrate 12. As will be discussed in much greater detail, a catalyst may be disposed on/throughout substrate 12.

Substrate 12 may comprise any material designed for use in a spark ignition or diesel engine environment and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst. Some possible materials include cordierite, silicon carbide, metal, metal oxides (e.g., aluminum oxide, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials may be in the form of foils, preform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore zirconium toughened aluminum oxide sponges, and porous ultra-low expansion glasses. Furthermore, these substrates may be coated with oxides and/or hexaaluminates, such as stainless steel foil coated with a hexaaluminate scale.

Although the substrate may have any size or geometry, the size and geometry are preferably chosen to optimize surface area in the given exhaust emission control device design parameters. For example, the substrate may have a honeycomb geometry, with the combs channel having any multi-sided or rounded shape, with substantially square, triangular, pentagonal, hexagonal, heptagonal, octagonal, or similar geometries preferred due to ease of manufacturing and increased surface area.

Located between the substrate 12 and the shell 18 may be a retention material 14 that insulates the shell 18 from both the exhaust fluid temperatures and the exothermic catalytic reaction occurring within the catalyst substrate 12. The retention material 14, which enhances the structural integrity of the substrate by applying compressive radial forces about it, reducing its axial movement and retaining it in place, may be concentrically disposed around the substrate to form a retention material/substrate subassembly 16.

The retention material 14, which may be in the form of a mat, particulates, or the like, may be an intumescent material (e.g., a material that comprises vermiculite component, i.e., a component that expands upon the application of heat), a non-intumescent material, or a combination thereof. These materials may comprise ceramic materials (e.g., ceramic fibers) and other materials such as organic and inorganic binders, and the like, or combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The retention material/substrate subassembly 16 may be concentrically disposed within a shell 18. The choice of material for the shell 18 depends upon the type of exhaust fluid, the maximum temperature reached by the substrate 12, the maximum temperature of the exhaust fluid stream, and the like. Suitable materials for the shell 18 may comprise any material that is capable of resisting under-car salt, temperature, and corrosion. For example, ferrous materials may be employed such as ferritic stainless steels. Ferritic stainless steels may include stainless steels such as, e.g., the 400—Series such as SS-409, SS-439, and SS-441, with grade SS-409 generally preferred.

End cone 20 (or alternatively an end cone(s), end plate(s), exhaust manifold cover(s), and the like), which may comprise similar materials as the shell, may be disposed at one or both ends of the shell. The end cone 20 (end plate or the like) is sealed to the shell to prevent leakage at the interface thereof. These components may be formed separately (e.g., molded or the like), or may be formed integrally with the housing using methods such as, e.g., a spin forming, or the like.

In an alternative method, for example, the shell may comprise two half shell components, also known as clamshells. The two half shell components are compressed together about the retention material/substrate subassembly, such that an annular gap preferably forms between the substrate and the interior surface of each half shell as the retention material becomes compressed about the substrate.

The exhaust emission treatment device 100 may be manufactured by one or more techniques, and, likewise, the retention material/substrate subassembly 16 may be disposed within the shell 18 using one or more methods. For example, the retention material/substrate subassembly 16 may be inserted into a variety of shells 18 using a stuffing cone. The stuffing cone is a device that compresses the retention material 14 concentrically about the substrate 12. The stuffing cone then stuffs the compressed retention material/substrate subassembly 16 into the shell, such that an annular gap preferably forms between the substrate 12 and the interior surface of the shell 18 as the retention material 14 becomes compressed about the substrate 12. Alternatively, if the retention material 14 is in the form of particles (e.g., pellets, spheres, irregular objects, or the like) the substrate 12 may be stuffed into the shell 18 and the retention material may be disposed in the shell 18 between the substrate 12 and the shell 18.

As briefly mentioned above, a catalyst may be disposed on and/or throughout (hereinafter "on") the substrate 12. The catalyst comprises a washcoat (e.g., a support material) and a precious metal. As will be discussed in greater detail, the washcoat comprises a zirconium and titanium solid solution. The term "solid solution" is used herein to generally refer to a single, substantially homogeneous, metal oxide crystallite or crystallites characterized in that the oxygen atoms in the crystal structure are attached to metal ions of more than one metallic species. These materials are further characterized by having a single crystal structure, whereby the oxygen atoms in the crystal structure are shared between the metal ions and are referred to as single-phase materials of tetragonal or cubic crystal structure. Additionally, a solid solution is noted as having different physical properties compared to those individual components making up the solid solution. Moreover, a solid solution differs from a physical mixture in that the solid solution has the components comprising the solid solution occupy positions on the same lattice of a crystalline structure.

The precious metal support material can include metal oxides and solid solutions of elements such as aluminum, zirconium, titanium, yttrium, lanthanum, cerium and combinations comprising at least one of the foregoing oxides, wherein combinations comprising at least one of zirconium or titanium are particularly preferred.

The precious metal support material preferably has a particle diameter, measured along the major axis, of less than or equal to about 5.0 micrometers, with less than or equal to about 2.5 micrometers preferred and less than or equal to about 0.6 micrometers more preferred.

Furthermore, a solid solution comprising zirconium-titanium is expected to be active $NO_x$ adsorbers because the solid solution is not expected to accumulate sulfur. Sulfur accumulation is known to deactivate certain $NO_x$ adsorber catalysts. The sulfur oxides adsorbed on the surface of the zirconium-titanium solid solutions are predicted to form a sulfate that may be readily decomposed. Without being bound to theory, this behavior may be explained by the fact that the solid solution sulfates are unstable as compared with independent sulfates of zirconium, titanium, yttrium, and lanthanum. As will be discussed in greater detail, the solid solution comprising the washcoat preferably further comprises yttrium and lanthanum as noted above.

The solid solution can further comprise stabilizer(s). Possible stabilizers include lanthanide series elements, with yttrium and lanthanum preferred. Preferably, yttrium, zirconium, lanthanum, and titanium all occupy the same lattice of a crystalline structure, within the structure the yttrium may be more associated with the zirconium as compared to the titanium (generally denoted as yttrium/zirconium) and the lanthanum may be more associated with the titanium as compared to the zirconium (generally denoted as lanthanum/titanium). Preferably, the solid solution comprises yttrium/zirconium-lanthanum/titanium. Without being bound by theory, the association of the yttrium with the zirconium and the association of lanthanum with the titanium may extend the life of catalyst. More particularly, as an example, lanthanum protects the titanium from nitric acid, which may form when $NO_x$ in the exhaust fluid mixes with condensed water vapor in an exhaust system. The nitric acid has a greater affinity to the lanthanum than the titanium, thereby protecting the titanium.

Alternatively, embodiments are envisioned wherein the washcoat comprises a physical mixture of at least two solid solutions. This physical mixture of at least two solid solutions is herein after referred to as a multiple solid solution. In such multiple solid solutions, a first solid solution comprises yttrium zirconium and a second solution comprises lanthanum titanium.

The yttrium, zirconium, lanthanum, and titanium components may be present in the solid solution in any ratio and have any particle size such that a solid solution is formed that is capable of being used in a $NO_x$ adsorber. For example, the ratio of zirconium to titanium may be about 20:80 to about 80:20. The ratio of yttrium to zirconium may be about 8:92 to about 0:100. The ratio of lanthanum to titanium may be about 8:92 to about 0:100. The term "ratio" as used herein refers to a molar ratio of the elements. Generally, the amounts of stabilizers are about 1 mole percent (mol %) to about 8 mol % or so, with about 3 mol % to about 7 mol %, based upon the total about of the metals and stabilizers. It is noted that all ranges disclosed herein are inclusive and combinable (e.g., ranges of less than or equal to about 25 mol %, with about 5 mol % to about 20 mol % desired, and about 10 mol % to about 15 mol % more desired, includes the ranges of about 5 mol % to about 25 mol %, about 10 mol % to about 25 mol %, about 5 mol % to about 15 mol %, etc.). For example, with the ratio of zirconium to titanium about 50:50 and the ratio of yttrium to zirconium about 8:92, the yttrium-zirconium-titanium solid solution would $Y_{0.04}Zr_{0.46}Ti_{0.50}$.

Additionally, the primary particles comprising the solid solution are nanoscale, i.e., the particles have dimensions that are measured in nanometers. For example, the components comprising the solid solution preferably have an average particle size (taken along the major diameter (i.e., the longest diameter)) of less than or equal to about 20 nanometers (nm), with less than or equal to about 10 nanometers more preferred. Since particles may form agglomerates, clusters, and the like (hereinafter "agglomerates"), the term "primary particle" is used herein to generally refer to the individual constituent particles comprising the agglomerate. In other words, a primary particle is a single particle, whereas an agglomerate comprises at least two primary particles. Preferably, the agglomerates have an average major diameter of less than or equal to about 20 micrometers, with less than or equal to about 10 micrometers more preferred. In various embodiments, the agglomerates may have an average major diameter of less than or equal to 5 micrometers. The agglomerate size may be determined after calcination, i.e., after the solid solution is disposed on, for example, a substrate and heated at temperatures up to about 800° C.

The solid solutions can be formed, for example, by first forming an organometallic precursor and then decomposing the precursor to form the solid solution. The organometallic precursor may preferably be formed by a hydrolytic process based on the etherification of alcohols. For example, titanium and/or a titanium salt can be reacted with an alcohol to form titanium alkoxide. The alkoxide has a carbon unit of 1 to 8, with 1 to 5 carbons preferred. For example iso-propyl alcohol or n-propyl alcohol are used to form an isopropoxy or n-propoxy group. Other alcohols include ethyl alcohol, n-propyl alcohol, iso-propyl alcohol, n-butyl alcohol, n-butyl alcohol, iso-butyl, n-butyl, sec-butyl and tert-butyl alcohol. Similarly, the other metals or their salts (e.g., zirconium, lanthanides, and the like, and/or their salts) can be reacted with an alcohol to form the metal alkoxide. The metal alkoxides can then be combined to form the organometallic precursor. Preferably they are combined in the presence of an organic acid (e.g., methacrylic acid). The precursor is then decomposed to form the solid solution. Decomposition can comprise adding water (e.g., preferably slowly (e.g., dropwise)), and/or evaporation. The solid solution can then be applied to the substrate and the precious metal subsequently added, or the precious metal can be added to the precursor during the formation of the solid solution. Once the catalyst has been formed (i.e., precious metal and solid solution), it is preferably heat treated to the maximum operating temperature intended for that catalyst application (e.g., for a diesel application, the catalyst is heat treated to about 700° C. to about 800° C. (preferably about 750° C.), while for a gasoline application, the catalyst is heat treated to about 1,050° C. to about 1,150° C. (preferably about 1,100° C.). Generally, the catalyst is heat treated to a temperature of greater than or equal to about 700° C.

In other embodiments, the yttrium, zirconium, titanium and lanthanum precursors can be inorganic acids such as nitrates, chlorides and organic acids such as acetates, or mixtures thereof. In these embodiments, alcohols or a water-alcohol mixture comprising about 1 wt % to about 20 wt % water are preferably used as the solvents. The precipitation reactions can occur by addition of the acidic precursor solution to water or water-ammonium hydroxide mixtures containing about 1 wt % to about 30 wt % ammonium hydroxide.

In an exemplary embodiment, titanium alkoxide, zirconium alkoxide, and an organic acid such as methacrylic acid are used to form the organometallic precursor $Zr_2Ti_4O_4$ [$OCH_2CH_2CH_2CH_3$][$OC(O)CH_3CH_2$]$_{10}$. This organometallic precursor decomposes during calcination. More particularly, the $Zr_2Ti_4O_4$ inorganic cluster resulting from the decomposition of $Zr_2Ti_4O_4$[$OCH_2CH_2CH_2CH_3$][$OC(O)CH_3CH_2$]$_{10}$ forms the desired zirconium-titanium solid solution.

In making an exhaust treatment device, the washcoat (e.g., a solid solution comprising zirconium-titanium) may be applied to a substrate(s) as a slurry by wash coating, imbibing, impregnating, physisorbing, chemisorbing, precipitating, and the like. Such techniques as spraying, dipping or painting may also be used. Alternatively, the washcoat may be applied to a support material, which may in turn be disposed on the substrate(s). Support materials may include, but is not limited to, a refractory inorganic oxide. The support component preferably comprises an inorganic oxide having thermal stability at temperatures of about 1,000° C. and less. Suitable refractory inorganic oxide components include, for example, delta aluminum oxide, silica-doped aluminum oxide, titanium oxide, zirconium oxide, lanthanum oxide, cerium oxide, and mixtures comprising one or more of the foregoing refractory inorganic oxides. Preferably, the washcoat is applied directly to the substrate.

The amount of solid solution in the washcoat is preferably greater than or equal to about 60 wt %, with greater than or equal to about 75 wt % more preferred, wherein the weight percent is based on the total weight of the washcoat. Also preferred within this range is an amount of solid solution of less than or equal to about 98 wt % with less than or equal to about 95 wt % more preferred. For example, the slurry can comprise about 2 wt % to about 40 wt % stabilized aluminum oxide with about 6 wt % to about 12 wt % stabilized aluminum oxide preferred.

Although the loading of the washcoat may vary with the cell density of the substrate, the washcoat preferably has a loading of less than or equal to about 10 grams per cubic inch (g/in$^3$), with a loading of about 4 g/in$^3$ to about 6 g/in3 generally employed. The solid solution component of the washcoat preferably has a loading of about 3.6 g/in$^3$ to 5.4 g/in$^3$. The term "cell" is used herein to refer to fluid channel channels comprising a substrate. These cells may have a honeycomb geometry, with the combs channel having any multi-sided or rounded shape, with substantially square, triangular, pentagonal, hexagonal, heptagonal, octagonal, or similar geometries preferred due to ease of manufacturing and increased surface area. The term cell density as used herein refers generally to the number of cells in a given area.

A precious metal may then be impregnated into the washcoat after calcination. Suitable precious metals include rhodium, platinum, palladium, ruthenium, iridium, gold, silver, and the like, and combinations comprising one or more of the foregoing catalytic metals. Additionally, in various exemplary embodiments, the activity of the catalyst for use in lean conditions can be extended by the use of a stabilized precious metal oxide(s). For example, barium and lanthanum may be used to stabilize platinum oxide. In an exemplary embodiment, the stabilized platinum oxide is $BaLa_2PtO_5$. The advantage of a stabilized platinum oxide is that suitable $NO_x$ conversion activity can be obtained at temperatures of about 270° C. to about 320° C., which is generally below the activity temperatures for non-oxidized platinum.

The precious metal may be loaded onto the washcoat. Preferably, the precious metal, e.g., platinum, comprises less than or equal to about 3 wt % of the total weight of the catalyst, with about 0.05 wt % to about 3 wt % preferred. The term "catalyst" as used herein refers to the total solids in the washcoat and the precious metal being loaded onto the washcoat. In various embodiments, the precious metal is loaded onto the substrate at less than or equal to about 60 grams per cubic foot (g/ft$^3$) (e.g., about 5 g/ft$^3$ to about 60 g/ft$^3$), with a loading of about 20 g/ft$^3$ to about 40 g/ft$^3$ preferred. Moreover, the precious metal preferably has an average particle size of less than or equal to about 10 nanometers (nm), with an average particle size of about 2 nm to about 4 nm preferred.

In alternative embodiments, the precious metal may be incorporated into the solid solution comprising the washcoat. In other words, the precious metal, for example, platinum, can occupy the same crystalline structure as the components making up the washcoat, for example, yttrium, zirconium, lanthanum, and/or titanium. Incorporating the precious metal into the solid solution can suppress the particle growth of the precious metal as well as suppress poisoning of the precious metal. Without being bound by theory, these effects may be realized as a result because, as noted above, a solid solution has unique physical properties compared to the components making up the solid solution. As such, the re-crystallization temperature may be increased, thus imparting, for example, the suppressed particle growth of the precious metal.

In addition to the stabilizers, metals, and precious metals, a sulfate inhibitor may be impregnated into the washcoat. Suitable sulfate inhibitors may include niobium, vanadium, and the like.

Advantageously, the disclosed washcoat comprising a zirconium-titanium solid solution is particularly useful as a NOx storage material. Compared to mixed oxides, the solid solution may have improved NOx storage ability and long-term stability. In addition, the solid solutions are expected to be more sulfur resistant than the oxides. Yet another feature is that employing stabilized platinum oxides in the catalysts compositions comprising solid solutions can extend lean exhaust activity to temperatures of about 270° C. to about 320° C., thereby reducing nitrogen oxide emissions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of making a catalyst, the method comprising the steps of:
   reacting a titanium salt with an alcohol to form a titanium alkoxide; and separately reacting a zirconium salt with an alcohol to form a zirconium alkoxide; followed by
   mixing the titanium alkoxide and the zirconium alkoxide in the presence of an organic acid to form an organometallic precursor; followed by
   decomposing the organometallic precursor to form a solid solution characterized by a zirconium-titanium oxide; and then
   adding a precious metal to the solid solution to form the catalyst.

2. The method of claim 1, wherein the solid solution further comprises yttrium and lanthanum.

3. The method of claim 1, wherein forming the organometallic precursor further comprises:
   reacting a yttrium salt with an alcohol to form a yttrium alkoxide;
   reacting a lanthanum salt with an alcohol to form a lanthanum alkoxide; and
   mixing the titanium alkoxide, the zirconium alkoxide, lanthanum alkoxide, and yttrium alkoxide to form the organometallic precursor.

4. The method of claim 1, wherein decomposing the organometallic precursor to form a solid solution further comprises adding water to the organometallic precursor.

5. The method of claim 1, wherein the organometallic precursor further comprises methacrylic acid.

6. The method of claim 1, wherein the organometallic precursor comprises $Zr_2Ti_4O_4[OCH_2CH_2CH_2CH_3][OC(O)CH_3CH_2]_{10}$.

7. The method of claim 1, wherein the organometallic precursor comprises a precious metal precursor.

8. The method of claim 1, further comprising heat treating the catalyst to a temperature of greater than or equal to about 700° C.

* * * * *